United States Patent
Kanaoka et al.

(10) Patent No.: US 6,875,507 B2
(45) Date of Patent: Apr. 5, 2005

(54) RESIN COMPOSITION, POLYVINYL CHLORIDE FIBERS AND PROCESS FOR PRODUCING THE SAME

(75) Inventors: Masamichi Kanaoka, Kamakura (JP); Akira Sakurai, Kamakura (JP); Akira Moroi, Kamakura (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/880,454

(22) Filed: Jul. 1, 2004

(65) Prior Publication Data

US 2004/0234759 A1 Nov. 25, 2004

(51) Int. Cl.[7] .............................. D01F 6/00; D01F 6/10; C08L 27/08
(52) U.S. Cl. ........................ 428/364; 428/394; 525/239
(58) Field of Search ................................ 428/364, 394; 525/239

(56) References Cited

U.S. PATENT DOCUMENTS 6,312,804 B1 * 11/2001 Yamane et al. ............. 428/364
6,465,099 B1 * 10/2002 Yamane et al. ............. 428/401

FOREIGN PATENT DOCUMENTS

| JP | 58081613 A | * | 5/1983 |
| JP | 60-18323 | | 5/1985 |
| JP | 10-102317 | | 4/1998 |
| JP | 63303110 A | * | 12/1998 |
| JP | 411117122 A | * | 4/1999 |

* cited by examiner

Primary Examiner—N. Edwards
(74) Attorney, Agent, or Firm—Young & Thompson

(57) ABSTRACT

A polyvinyl chloride fiber which comprises a composition having 100 parts by weight of a vinyl chloride resin, from 3 to 20 parts by weight of a chlorinated vinyl chloride resin having a chlorine content of from 57.0 to 62.0% and an average polymerization degree of from 550 to 750, and from 5 to 50 parts by weight of a chlorinated vinyl chloride resin having a chlorine content of from 65.0 to 67.0% and an average polymerization degree of from 550 to 750.

3 Claims, No Drawings

RESIN COMPOSITION, POLYVINYL CHLORIDE FIBERS AND PROCESS FOR PRODUCING THE SAME

FIELD OF THE INVENTION

This invention relates to polyvinyl chloride fiber, particularly to a resin composition which maintains the conventional spinning performance and shows less heat shrinkage even in an atmosphere of 100° C. or more, a polyvinyl chloride fiber and a method for producing the same.

BACKGROUND ART

Being excellent in its properties such as strength, ductility and transparency, polyvinyl chloride fiber has been used frequently as a fiber for insect net and artificial hair; for example, a method has been disclosed for the production of a polyvinyl chloride fiber comprising a composition having a vinyl chloride resin and a chlorinated vinyl chloride resin (e.g., JP-B-60-18323).

In the polyvinyl chloride fiber of this means, one component is dispersed in the other component as an islands component inside the fiber, and the fiber is crimped by heating.

However, according to the polyvinyl chloride fiber of the aforementioned means, when a heat of 100° C. or more is applied to the fiber for carrying out its secondary processing, its heat shrinkage progresses more than the necessity so that the processing characteristics become poor.

In this connection, a method in which heat shrinkage of a resin composition itself is reduced by increasing formulating amount of a chlorinated vinyl chloride resin in the composition can be considered for the purpose of adjusting crimpness of the fiber, but since the vinyl chloride resin and chlorinated vinyl chloride resin are originally poor in compatibility, simple increase in the blending amount of chlorinated vinyl chloride resin causes phase separation when melt spinning of the fiber is carried out, and the spinning performance therefore becomes poor which is not desirable.

Accordingly, for the purpose of improving compatibility of the vinyl chloride resin with the chlorinated vinyl chloride resin, a method in which an ethylene-vinyl acetate/vinyl chloride graft polymer resin prepared by graft-polymerizing vinyl chloride to an ethylene-vinyl acetate copolymer is added thereto has been disclosed (e.g., JP-A-10-102317).

SUMMARY OF THE INVENTION

However, since heat shrinkage the ethylene-vinyl acetate/vinyl chloride graft polymer resin itself is similar to that of the vinyl chloride resin, heat shrinkage of the resin composition itself is increased even in case that compatibility of the vinyl chloride resin with chlorinated vinyl chloride resin is improved, which is not desirable. That is, it is necessary to select a resin which can improve compatibility of the vinyl chloride resin with chlorinated vinyl chloride resin and has heat shrinkage by the resin itself to a certain degree, but selection of a satisfactory resin has not been achieved yet.

Accordingly, the object of the invention is to provide a polyvinyl chloride fiber which can improve compatibility of a vinyl chloride resin with a chlorinated vinyl chloride resin and shows less heat shrinkage even in an atmosphere of 100° C. or more, while keeping spinning performance at the time of melt spinning.

Taking the aforementioned problems into consideration, the present inventors have conducted intensive studies and found as a result of the efforts that the aforementioned problems can be solved by a resin composition which comprises 100 parts by weight of a vinyl chloride resin, from 3 to 20 parts by weight of a chlorinated vinyl chloride resin having a chlorine percentage content of from 57.0 to 62.0% and an average polymerization degree of from 550 to 750 (to be referred to as compatible vinyl chloride resin hereinafter), and from 5 to 50 parts by weight of a chlorinated vinyl chloride resin having a chlorine percentage content of from 65.0 to 67.0% and an average polymerization degree of from 550 to 750 (to be referred to as heat resistant vinyl chloride resin hereinafter), thus resulting in the accomplishment of the invention.

The invention described in to claim 2 is a polyvinyl chloride fiber obtainable by making the resin composition according to claim 1 into a fibrous form, which renders possible prevention of heat shrinkage and acquirement of high spinning performance.

The invention described in claim 3 is a method for producing a polyvinyl chloride fiber, which comprises melt-spinning a resin composition comprising 100 parts by weight of a vinyl chloride resin, from 3 to 20 parts by weight of a chlorinated vinyl chloride resin having a chlorine content of from 57.0 to 62.0% and an average polymerization degree of from 550 to 750, and from 5 to 50 parts by weight of a chlorinated vinyl chloride resin having a chlorine content of from 65.0 to 67.0% and an average polymerization degree of from 550 to 750, that renders possible production of a polyvinyl chloride fiber capable of preventing heat shrinkage and having high spinning performance.

DETAILED DESCRIPTION OF THE INVENTION

The vinyl chloride resin to be used in the invention is employed as the base polymer of the resin composition and vinyl chloride resin. Regarding the average polymerization degree of the vinyl chloride resin, melt viscosity is reduced and the obtained fiber is at to cause heat shrinkage when it is too low, and molding temperature becomes high and coloration of the fiber is generated due to increased melt viscosity when it is too high, so that the degree is desirably from 600 to 1,300.

Illustrative examples of the vinyl chloride resin include a conventionally well known vinyl chloride homopolymer, a copolymer of vinyl chloride with a monomer such as ethylene, propylene, an alkyl vinyl ether, vinylidene chloride, vinyl acetate, a acrylic acid ester or a maleic acid ester, and a mixture thereof.

The compatible vinyl chloride resin according to the invention is employed as a compatibilyzing agent for the vinyl chloride resin and heat resistant vinyl chloride resin. Regarding the compatible vinyl chloride resin, it is a product of chlorinating a vinyl chloride resin, and it can be compatibilyzed with both of the vinyl chloride resin and heat resistant vinyl chloride resin by specifying the chlorine content.

Regarding the chlorine content of the compatible vinyl chloride resin, phase separation from the heat resistant vinyl chloride resin occurs when it is too small, and phase separation from the vinyl chloride resin occurs when it is too large, so that its effect as their compatibilyzing agent cannot be obtained and the spinning performance is reduced. Accordingly, the chlorine content of the compatible vinyl chloride resin is from 57.0 to 62.0%.

Also, regarding the polymerization degree of the compatible vinyl chloride resin, the effect to reduce heat shrinkage of the vinyl chloride resin cannot be obtained when it is too small, and the spinning performance becomes poor when it is too large, so that it is from 550 to 750.

In addition, regarding the amount of the compatible vinyl chloride resin, its effect as the compatibilyzing agent cannot be fully exerted and the spinning performance becomes poor when it is too small, and proportionally greater effect cannot be obtained when it is too large, so that it is from 3 to 20 parts by weight based on 100 parts by weight of the vinyl chloride resin. It is preferably 5 to 20 parts by weight based on 100 parts by weight of the vinyl chloride resin.

The heat resistant vinyl chloride resin according to the invention is employed for reducing heat shrinkage of the vinyl chloride resin. Regarding the heat resistant vinyl chloride resin, it is a product of chlorinating a vinyl chloride resin, and spinning performance of the vinyl chloride resin is maintained and heat shrinkage is reduced by specifying the chlorine percentage content.

Regarding the chlorine content of the heat resistant vinyl chloride resin, its effect for reducing heat shrinkage is not obtained when it is too small, and the spinning performance becomes poor when it is too large, so that it is from 65.0 to 67.0%.

Also, regarding the polymerization degree of the heat resistant vinyl chloride resin, the effect to reduce heat shrinkage cannot be obtained when it is too small, and the spinning performance becomes poor when it is too large, so that it is from 550 to 750.

In addition, regarding the amount of the heat resistant vinyl chloride resin, the effect to reduce heat shrinkage cannot be obtained when it is too small, and the spinning performance becomes poor when it is too large, so that it is from 5 to 50 parts by weight based on 100 parts by weight of the vinyl chloride resin. It is preferably 5 to 30 parts by weight based on 100 parts by weight of the vinyl chloride resin.

In this connection, these compatible vinyl chloride resin and heat resistant vinyl chloride resin are obtained by carrying out a gas phase, liquid phase or the like chlorination method of a vinyl chloride resin polymerized by mass or suspension polymerization or by a method particularly advantageous for the chlorination.

According to the polyvinyl chloride fiber of the invention, a well known additive agent conventionally used in a polyvinyl chloride composition may be blended therewith in response to the object. Examples of the additive agent include a lubricant, a heat stabilizer, a processing auxiliary, a reinforcing agent, an ultraviolet ray absorbent, an antioxidant, an antistatic agent, a filler, a fire retardant, a pigment, an initial stage coloration improving agent, a conductivity providing agent, a surface treating agent, a light stabilizer and a perfume.

The polyvinyl chloride fiber of the invention is obtained by mixing these materials using a conventionally known mixing machine (such as Henschel mixer or ribbon blender), melt-spinning the mixture using a conventionally known melt extruder (such as a single screw extruder, a different direction twin screw extruder or a conical extruder), and then carrying out a stretching treatment and a heat relaxation treatment.

According to the invention, a polyvinyl chloride fiber which keeps the conventional spinning performance and shows less heat shrinkage even in an atmosphere of 100° C. or more is obtained based on the polyvinyl chloride fiber obtained by forming a composition into a fibrous form, which comprises 100 parts by weight of the vinyl chloride resin, from 3 to 20 parts by weight of the compatible vinyl chloride resin and from 5 to 50 parts by weight of the heat resistant vinyl chloride resin.

EXAMPLES

Examples of the invention will be given below, but the invention is not restricted by these examples.

Examples of the invention are described with reference to Table 1 and by comparing with comparative examples.

Table 1 shows formulation of the vinyl chloride resins in each of the inventive and comparative examples and results of the measurement of the characteristics of the polyvinyl chloride fibers produced by respective formulation.

TABLE 1

| | | Example | | | Comparative Example | | | | | | | | | | | |
|---|---|---|---|---|---|---|---|---|---|---|---|---|---|---|---|---|
| | | 1 | 2 | 3 | 1 | 2 | 3 | 4 | 5 | 6 | 7 | 8 | 9 | 10 | 11 | 12 |
| Formulation | | | | | | | | | | | | | | | | |
| Polyvinyl chloride | Amount (parts by weight) | 100 | 100 | 100 | 100 | 100 | 100 | 100 | 100 | 100 | 100 | 100 | 100 | 100 | 100 | 100 |
| Compatible vinyl chloride resin | Chlorine content (%) | 62.0 | 62.0 | 62.0 | 55.0 | 64.0 | 62.0 | 62.0 | 62.0 | 62.0 | 62.0 | 62.0 | 62.0 | 62.0 | 62.0 | 62.0 |
| | Polymerization degree | 600 | 600 | 600 | 600 | 600 | 500 | 800 | 600 | 600 | 600 | 600 | 600 | 600 | 600 | 600 |
| | Amount (parts by weight) | 15 | 3 | 15 | 15 | 15 | 15 | 15 | 1 | 35 | 15 | 15 | 15 | 15 | 15 | 15 |
| Heat resistant vinyl chloride resin | Chlorine content (%) | 66.5 | 66.5 | 66.5 | 66.5 | 66.5 | 66.5 | 66.5 | 66.5 | 66.5 | 63.0 | 68.0 | 66.5 | 66.5 | 66.5 | 66.5 |
| | Polymerization degree | 700 | 700 | 700 | 700 | 700 | 700 | 700 | 700 | 700 | 700 | 700 | 500 | 800 | 700 | 700 |
| | Amount (parts by weight) | 15 | 15 | 35 | 15 | 15 | 15 | 15 | 15 | 15 | 15 | 15 | 15 | 15 | 3 | 60 |
| Compound stabilizer | Amount (parts by weight) | 6.0 | 6.0 | 6.0 | 6.0 | 6.0 | 6.0 | 6.0 | 6.0 | 6.0 | 6.0 | 6.0 | 6.0 | 6.0 | 6.0 | 6 |
| Characteristics | | | | | | | | | | | | | | | | |
| Heat shrinkage | | ◯ | ◯ | ◯ | ◯ | ◯ | X | ◯ | ◯ | ◯ | X | ◯ | X | ◯ | X | ◯ |
| Spinning performance | | ◯ | ◯ | ◯ | X | X | ◯ | X | X | ◯ | ◯ | X | ◯ | X | ◯ | X |

As shown in Table 1, the polyvinyl chloride fiber of the invention was obtained by melt-spinning a composition prepared by blending 100 parts by weight of a vinyl chloride resin (TH-1000, mfd. by Taiyo vinyl) with 15 parts by weight of a compatible vinyl chloride resin having a chlorine content of 62.0% and a polymerization degree of 600 (HA-15E, mfd. by Sekisui Chemical), 15 parts by weight of a heat resistant vinyl chloride resin having a chlorine content of 66.5% and a polymerization degree of 700 (HA-24K, mfd. by Sekisui Chemical) and 6.0 parts by weight of a compound stabilizer (LHR-107, mfd. by Sakai Chemical Industry), using a melt extruder, and then forming the resulting product into a fiber having an average size of 60 deniers via a stretching treatment and a heat relaxation treatment.

In this connection, in the melt spinning of the polyvinyl chloride fiber of this example, the aforementioned composition is molded into an average size of 180 deniers by extruding it from a full-flighted screw having a triangular sectional shape of L/D=26, CR=1.1 and a constant pitch and a spinning mold having a nozzle sectional area of 0.06 mm$^2$, a pore number of 120 and a mold temperature of 175° C., with an extrusion output of 10 Kg/hour.

L/D means total length (L) of feed section, compression section and metering section of the screw, based on the screw diameter (D). CR means abbreviation of compression ratio, or volume ratio per pitch of the feed section and metering section of the screw.

In addition, the stretching treatment is carried out by stretching the fiber obtained by melt spinning to 300% in an atmosphere of 105° C., and the relaxation treatment is carried out by treating the stretched fiber with heat in an atmosphere of 110° C. until total length of the fiber contracts to 75% of the length before the treatment. In this connection, conditions of the comparative examples shown in the following are similar to those of this example unless otherwise noted.

In Table 1, the heat shrinkage means ratio of heat shrinkage generated when a sample to be tested is treated with heat. In the heat shrinkage test, a sample to be tested adjusted to a length of 100 mm was heat-treated for 15 minutes in a gear oven of 110° C. to measure the ratio of lengths of the sample to be tested before and after the heat treatment, and a heat shrinkage ratio of less than 10% was evaluated as ◯, and 10% or more as X. In this case, the number of sample to be tested was set to 10.

Also in Table 1, the spinning performance means moldability when melt spinning of the aforementioned composition is carried out. In testing the spinning performance, the frequency of generating thread breakage (a phenomenon in which several fibrous bodies are broken during melt extrusion) was measured when 120 fibrous bodies were simultaneously extrusion-molded from a spinning mold, and a thread breakage frequency of 1 or less generated during the measurement was evaluated as 603, and generation of 2 or more times as X. In this case, the measuring time was set to 30 minutes, and the measuring frequency to 3 times.

In this example, the intended polyvinyl chloride fiber was obtained with excellent heat shrinkage and spinning performance.

Example 2 and Example 3 are described. In the polyvinyl chloride fibers of Example 2 and Example 3, the screw of Example 1 was changed to a full-flighted screw of a constant pitch single thread having a shape of L/D=26, CR=2.3, and the blending amount of the compatible vinyl chloride resin was changed to 3 parts by weight, or the blending amount of the heat resistant vinyl chloride resin to 35 parts by weight.

In these Examples, the intended polyvinyl chloride fibers showing excellent heat shrinkage and spinning performance were obtained.

Comparative Example 1 and Comparative Example 2 are described. In the polyvinyl chloride fibers of Comparative Example 1 and Comparative Example 2, the chlorine content of the compatible vinyl chloride resin of Examples were changed to 55.0% and 64.0%, respectively. The spinning performance was poor in Comparative Example 1 and Comparative Example 2.

Comparative Example 3 and Comparative Example 4 are described. In the polyvinyl chloride fibers of Comparative Example 3 and Comparative Example 4, the polymerization degree of the compatible vinyl chloride resin of Examples were changed to 500 and 800, respectively. The heat shrinkage was poor in Comparative Example 3, and the spinning performance was poor in Comparative Example 4.

Comparative Example 5 and Comparative Example 6 are described. In the polyvinyl chloride fibers of Comparative Example 5 and Comparative Example 6, the amount of the compatible vinyl chloride resin of Examples were changed to 1 part by weight and 35 parts by weight, respectively. The spinning performance was poor in Comparative Example 5, and though both of the heat shrinkage and spinning performance were good in Comparative Example 6, greater effects proportional to the blending amount were not obtained because the effects of the compatible vinyl chloride resin reached its ceiling.

Comparative Example 7 and Comparative Example 8 are described. In the polyvinyl chloride fibers of Comparative Example 7 and Comparative Example 8, the chlorine content of the heat resistant vinyl chloride resin of Examples were changed to 63.0% and 68.0%, respectively. The heat shrinkage was poor in Comparative Example 7, and the spinning performance was poor in Comparative Example 8.

Comparative Example 9 and Comparative Example 10 are described. In the polyvinyl chloride fibers of Comparative Example 9 and Comparative Example 10, the polymerization degree of the heat resistant vinyl chloride resin of Examples were changed to 500 and 800, respectively. The heat shrinkage was poor in Comparative Example 9, and the spinning performance was poor in Comparative Example 10.

Comparative Example 11 and Comparative Example 12 are described. In the polyvinyl chloride fibers of Comparative Example 11 and Comparative Example 12, the amount of the heat resistant vinyl chloride resin of Examples were changed to 3 parts by weight and 60 parts by weight, respectively. The heat shrinkage was poor in Comparative Example 11, and the spinning performance was poor in Comparative Example 12.

According to the invention, a polyvinyl chloride fiber which keeps the conventional spinning performance and shows less heat shrinkage even in an atmosphere of 100° C. or more was obtained based on a polyvinyl chloride fiber obtained by forming a composition into a fibrous form, which comprises 100 parts by weight of a vinyl chloride resin, from 3 to 20 parts by weight of a compatible vinyl chloride resin and from 5 to 50 parts by weight of a heat resistant vinyl chloride resin.

What is claimed is:

1. A resin composition which comprises:

100 parts by weight of a vinyl chloride resin, from 3 to 20 parts by weight of a chlorinated vinyl chloride resin having a chlorine content of from 57.0 to 62.0% and an average polymerization degree of from 550 to 750, and from 5 to 50 parts by weight of a chlorinated vinyl chloride resin having a chlorine content of from 65.0 to 67.0% and an average polymerization degree of from 550 to 750.

2. A polyvinyl chloride fiber obtainable by making the resin composition according to claim 1 into a fibrous form.

3. A method for producing a polyvinyl chloride fiber, which comprises melt-spinning the resin composition according to claim 1.

* * * * *